US010701562B2

(12) United States Patent
Johnson

(10) Patent No.: US 10,701,562 B2
(45) Date of Patent: Jun. 30, 2020

(54) BLOCKING UNDESIRABLE COMMUNICATIONS IN VOICE OVER INTERNET PROTOCOL SYSTEMS

(71) Applicant: MICROSOFT TECHNOLGY LICENSING, LLC, Redmond, WA (US)

(72) Inventor: Warren Johnson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 16/012,784

(22) Filed: Jun. 20, 2018

(65) Prior Publication Data
US 2018/0302791 A1 Oct. 18, 2018

Related U.S. Application Data

(63) Continuation of application No. 15/099,657, filed on Apr. 15, 2016, now Pat. No. 10,028,145.

(51) Int. Cl.
*H04W 12/08* (2009.01)
*H04L 29/06* (2006.01)
(Continued)

(52) U.S. Cl.
CPC ............ *H04W 12/08* (2013.01); *H04L 45/08* (2013.01); *H04L 65/1079* (2013.01);
(Continued)

(58) Field of Classification Search
None
See application file for complete search history.

(56) References Cited

U.S. PATENT DOCUMENTS 8,141,152 B1 3/2012 Hwang et al.
8,181,251 B2 5/2012 Kennedy
(Continued)

FOREIGN PATENT DOCUMENTS

EP 1746814 A2 1/2007
WO 2007019583 A2 2/2007
WO 2007141209 A1 12/2007

OTHER PUBLICATIONS

"Office Action Issued in European Patent Application No. 17719973.4", dated Dec. 6, 2019, 7 Pages.
(Continued)

*Primary Examiner* — Kodzovi Acolatse
(74) *Attorney, Agent, or Firm* — Michael Best & Friedrich LLP

(57) ABSTRACT

Blocking of undesirable voice over internet protocol (VOIP) communications is disclosed. A communication screening service initiates operations to block a threat posed by a VOIP communication upon receiving the communication from a gateway server. The communication may include an audio/video conversation and/or an audio/video conference. Next, metadata and content of the communication is analyzed to detect a threat, such as a scamming scheme and/or a phishing scheme, from a sender of the communication. A rejection of the communication is generated to disrupt the threat associated with the communication. The rejection is transmitted to the gateway server to prompt the gateway server to block the communication.

18 Claims, 7 Drawing Sheets

(51) Int. Cl.
  *H04L 12/751* (2013.01)
  *H04M 1/253* (2006.01)
  *H04W 12/12* (2009.01)
  *H04W 80/04* (2009.01)
  *H04W 88/16* (2009.01)

(52) U.S. Cl.
  CPC ......... *H04M 1/2535* (2013.01); *H04W 12/12* (2013.01); *H04W 80/04* (2013.01); *H04W 88/16* (2013.01)

(56) References Cited

U.S. PATENT DOCUMENTS

| | | | |
|---|---|---|---|
| 8,199,746 | B2 | 6/2012 | Rosenberg et al. |
| 8,339,959 | B1 | 12/2012 | Moisand et al. |
| 8,457,367 | B1 | 6/2013 | Sipe et al. |
| 8,555,384 | B1 | 10/2013 | Hanson et al. |
| 9,531,873 | B2 | 12/2016 | Kurapati et al. |
| 9,544,272 | B2 | 1/2017 | Alperovitch et al. |
| 10,102,055 | B1* | 10/2018 | Gaber ................... G06F 11/079 |
| 2005/0132060 | A1 | 6/2005 | Mo et al. |
| 2005/0232229 | A1 | 10/2005 | Miyamoto et al. |
| 2005/0259667 | A1 | 11/2005 | Vinokurov et al. |
| 2005/0273855 | A1 | 12/2005 | Oberle et al. |
| 2006/0114832 | A1 | 6/2006 | Hamilton et al. |
| 2006/0187900 | A1* | 8/2006 | Akbar ................. H04M 7/0066 370/352 |
| 2007/0076853 | A1 | 4/2007 | Kurapati et al. |
| 2007/0121596 | A1* | 5/2007 | Kurapati ........... H04L 29/06027 370/356 |
| 2007/0150773 | A1 | 6/2007 | Srivastava |
| 2007/0177615 | A1 | 8/2007 | Miliefsky |
| 2008/0075258 | A1 | 3/2008 | Liu et al. |
| 2010/0242082 | A1 | 9/2010 | Keene et al. |
| 2011/0145182 | A1 | 6/2011 | Dlugosch et al. |
| 2011/0294478 | A1 | 12/2011 | Trivi et al. |
| 2012/0027008 | A1* | 2/2012 | Chou ..................... H04L 45/00 370/352 |
| 2012/0106401 | A1 | 5/2012 | Rosenberg et al. |
| 2012/0233656 | A1* | 9/2012 | Rieschick ........... H04L 63/1441 726/1 |
| 2013/0109358 | A1 | 5/2013 | Balasubramaniyan et al. |
| 2013/0246501 | A1* | 9/2013 | Scheer ................ G08B 25/006 709/202 |
| 2014/0373140 | A1* | 12/2014 | Waters, Jr. .......... H04L 63/1458 726/22 |
| 2015/0026786 | A1 | 1/2015 | Alexander |
| 2016/0261627 | A1* | 9/2016 | Lin ........................ H04W 4/18 |
| 2017/0012982 | A1 | 1/2017 | Carter |
| 2017/0063883 | A1 | 3/2017 | Martinez |
| 2017/0111506 | A1 | 4/2017 | Strong et al. |
| 2017/0244749 | A1 | 8/2017 | Shulman et al. |
| 2017/0251016 | A1* | 8/2017 | Niv ........................ H04L 43/08 |
| 2017/0303126 | A1 | 10/2017 | Johnson |
| 2019/0347591 | A1* | 11/2019 | Lawless ............. G06Q 10/0635 |

OTHER PUBLICATIONS

International Search Report and Written Opinion Issued in PCT Application No. PCT/US2017/026475, dated Jul. 4, 2017, 11 Pages.

Dantu, et al., "Detecting Spam in VoIP Networks", In Proceedings of the Steps to Reducing Unwanted Traffic on the Internet Workshop, Jul. 2005, pp. 31-37.

Sadhayo, et al., "Preventing Spit with Naive Bayes in Voip Communication", In Journal of Engineering, Science & Technology, vol. 13, No. 1, Jan. 2014, pp. 1-7.

Nassar, et al., "Voip Honeypot Architecture", In Proceedings of 10th IFIP/IEEE International Symposium on Integrated Network Management, May 2007, pp. 109-118.

Saad, et al., "Automated Intrusion Detection and Prevention System over SPIT (AIDPoS)", In Proceedings of International Symposium on Technology Management and Emerging Technologies, Aug. 25, 2015, pp. 58-63.

Bai, et al., "Detection and filtering Spam over Internet Telephony—a user-behavior-aware intermediate-network-based-approach", In Proceedings of IEEE International Conference on Multimedia and Expo, Jun. 28, 2009, pp. 726-729.

IRanmanesh, et al., "A Voice Spam Filter to Clean Subscribers' Mailbox", In Proceedings of 8th International ICST Conference on Security and Privacy in Communication Networks, Sep. 3, 2012, pp. 1-18.

* cited by examiner

BLOCKING UNDESIRABLE COMMUNICATIONS IN VOICE OVER INTERNET PROTOCOL SYSTEMS

CROSS-REFERENCE TO RELATED APPLICATION

This application is a continuation under 35 U.S.C. § 120 of co-pending U.S. patent application Ser. No. 15/099,657 filed on Apr. 15, 2016. The U.S. Patent Application is herein incorporated by reference in its entirety.

BACKGROUND

Data collection, management, and analysis has changed work processes associated product management. Automation and improvements in work processes have expanded the scope of capabilities offered by businesses. With the development of faster and smaller electronics the execution of mass processes for data analysis systems have become feasible. Indeed, analysis work at data centers, data warehouses, and data workstations have become common business features in modern work environments. Such systems execute a wide variety of applications ranging from enterprise resource management applications to complicated analysis tools. Many such applications screen communications.

The volume of communications complicates the data aggregation associated with a legitimacy of the communications. Indeed, sheer size of incoming and outgoing communication render real-time threat processing difficult if not near an impossible task. While maintaining spam monitoring, an additional layer of complication faced by communication management products includes scam and phishing detection and prevention. Complications with the detection of scam and phishing attempts prevent reliable implementation of communication solutions.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to the disruption of undesirable communications in a voice over internet protocol (VOIP) system. In some examples, a communication screening service executed in a datacenter may initiate operations to block incoming undesirable communications upon receiving a communication from a gateway server. The communication may include the VOIP call, such as an audio call, a video call, a multi-modal conversation, or a teleconference. Next, the communication screening service may analyze metadata and the content of the communication to detect the nature of the communication. The communication may include a scamming scheme and/or a phishing scheme, for example. When harmful communications are detected the communication may be terminated to protect users. A communication rejection response may be transmitted to the gateway server, which may prompt the gateway server to block future communications with the malicious system users(s).

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
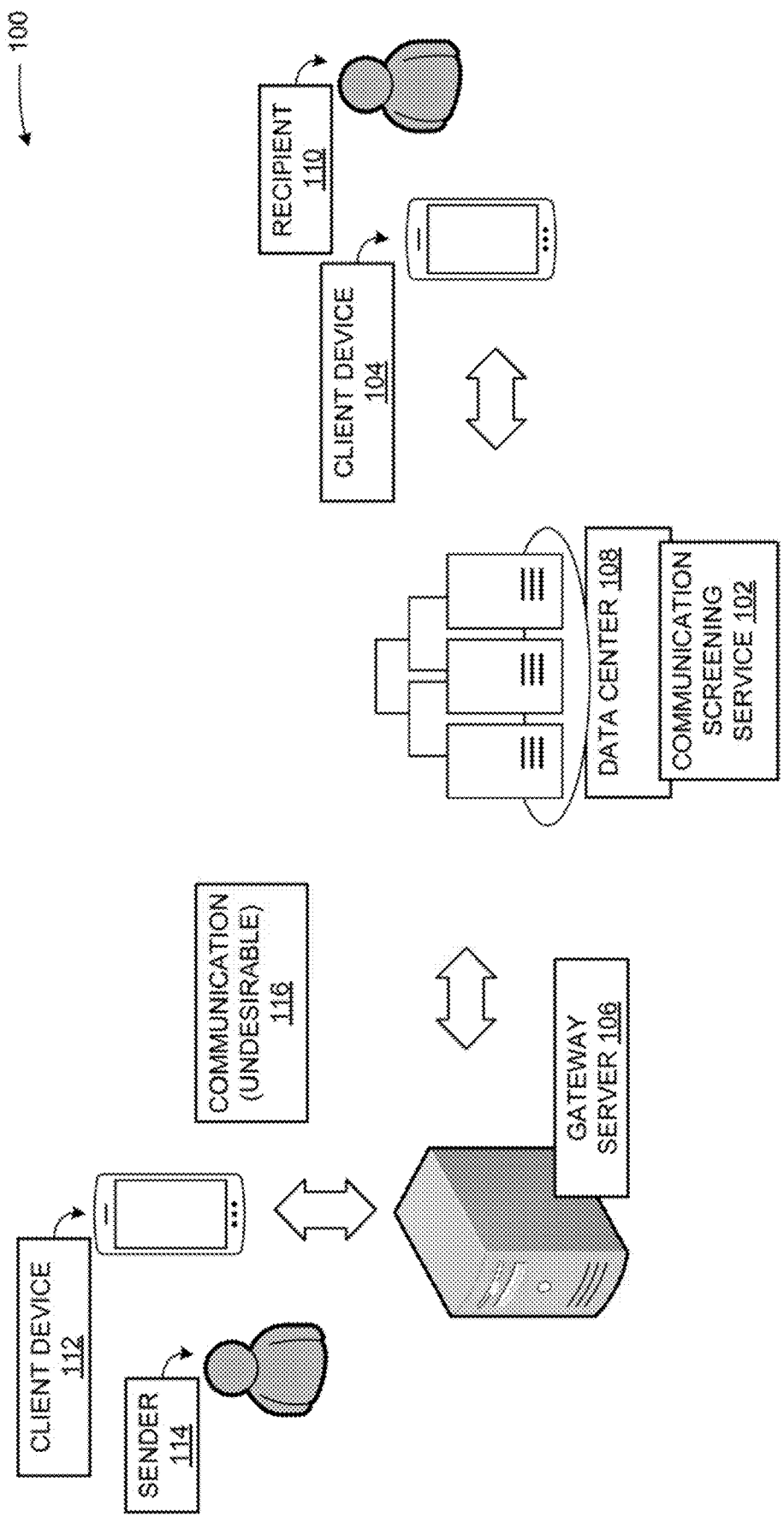
FIG. 1 is a conceptual diagram illustrating an example of blocking undesirable communications in a voice over internet protocol (VOIP) system, according to embodiments.

As briefly described above, a communication screening service may be provided to block undesirable communications in a VOIP system. In an example scenario, the communication screening service may receive a call at a gateway server of a datacenter from another gateway server, a Public Switch Telephone Network (PSTN), or another communication system (e.g., another VOIP system). The gateway server may be a communication server that routes communication(s) from an external network to an internal network. The gateway server may act as a gatekeeper to the internal communication routing and may manage initial processing and routing of the communication(s).

Metadata and a content of the communication may be analyzed to detect a malicious intent or undesirability of the communication, such as a scamming call, a phishing call, or any other undesirable call. The analysis of the content of the communication may include, in some embodiments, speech-to-text conversion of audio communications and analysis of the textual data such as comparison to known threat or undesirability patterns. In other embodiments, aspects of video communication such as gestures, body posture, facial activity, etc. may be analyzed to determine malicious intent or undesirable communications (e.g., telemarketing calls, survey calls, etc.). The intended recipient of the call may include an individual, a group, and/or an organization. Other individual(s), group(s), and/or organization(s) may also be affected by the undesirable communication, which may result—if allowed through—in loss of sensitive data, financial loss, etc.

Next, the communication screening service may generate a rejection of the communication to disrupt a potential threat (e.g., scam or phishing) associated with the communication and save a unique signature associated with the malicious communication. The saved signature may be used to identify future malicious callers. The rejection may include instruction(s) to disconnect the communication, operation(s) to disconnect the communication, notify the recipient of the threat, report the communication to law enforcement, and/or notify a sender of the detected threat and action(s) to report to law enforcement, among others. Furthermore, the rejection may be transmitted to the gateway server to prompt the gateway server to disrupt the communication.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to block undesirable communications in a VOIP system. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with text, audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1 is a conceptual diagram illustrating an example of blocking undesirable communications in a VOIP system, according to embodiments.

In a diagram 100, a datacenter 108 may execute a communication screening service 102. The datacenter 108 may include one or more physical servers providing one or more services (or applications) to client devices. A service may include an application performing operations in relation to a client application and/or a subscriber, among others. The datacenter 108 may also may include as a component and/or may interact with a mobile device, a workstation, and/or a data warehouse, among others.

In an example scenario, the datacenter 108 may be part of a unified communication (UC) system in which users may communicate via a variety of end devices including a tablet, a smart phone, a laptop computer, and a desktop computer, which are client devices of the UC system. Each client device may be capable of executing one or more communication applications such as UC client application for voice communication, video communication, instant messaging, application sharing, data sharing, and similar ones. Client devices may include any type of smart phone, cellular phone, any computing device executing a communication application, a smart automobile console, and advanced phone devices with additional functionality.

The datacenter 108 may execute the communication screening service 102 to block undesirable communications in a VOIP system. The communication screening service 102 may initiate operations upon receiving a communication 116 from a gateway server 106. The gateway server 106 may have received and forwarded the communication 116 from a client device 112 used by a sender 114. The gateway server 106 may be a communication server providing operations to manage and route communications between an external network and an internal network. The communication may be transmitted as a VOIP message, which may include an audio and/or a video conversation and/or an audio and/or a video conference, a text based message, and/or, an email, among others.

Next, the communication screening service 102 may analyze metadata and content of the communication to detect a nature of the communication 116. For example, the communication 116 may include a potential threat in form of a scamming scheme and/or a phishing scheme. The metadata may include attributes of the message such as an origin, and/or a destination address, a payload, among other attributes stored at a section of the message such as a header. The content of the message may include a variety of media such as an audio and/or a video stream, among others. The communication screening service 102 may generate a rejection of the received communication to disrupt the potential threat associated with the communication and prevent a delivery of the communication to a client device 104 of a recipient 110. The rejection may include instruction(s) to the gateway server 106 to terminate the communication 116, notify the recipient 110 of the threat, escalate the notification to a law enforcement agency, and/or warn the sender 114 of the detected threat, among other things. Furthermore, the rejection may be transmitted to the gateway server 106 to prompt the gateway server to disrupt the communication 116.

The datacenter 108 may include a UC control server, which may act as a Session Initiation Protocol (SIP) user agent. In a UC system, users may have one or more identities (such as a call identifier), which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method. SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer. Various components of the system may communicate using protocols like SIP, hypertext transport protocol (HTTP), and comparable ones.

The datacenter 108 may communicate with the client device 104 through a network. The network may provide wired or wireless communications between nodes such as the client device 104, or the datacenter 108, among others. Previous example(s) to block undesirable communications in a VOIP system through the communication screening service 102 are not provided in a limiting sense. Alternatively, the gateway server 106 may execute the communication screening service 102 or a client of the communication screening service 102 to execute operations to block the undesirable communications at the gateway server. Furthermore, the communication screening service 102 may manage disconnect operations to disrupt the communication 116 at the datacenter 108.

The recipient 110 may interact with a client application, such as a UC client application, with a keyboard based input, a mouse based input, a voice based input, a pen based input, and a gesture based input, among others. The gesture based input may include one or more touch based actions such as a touch action, a swipe action, and a combination of each, among others.

While the example systems in FIG. 1 has been described with specific components including the datacenter 108, the communication screening service 102, embodiments are not limited to these components or system configurations and can be implemented with other system configuration employing fewer or additional components.

Figure 2:
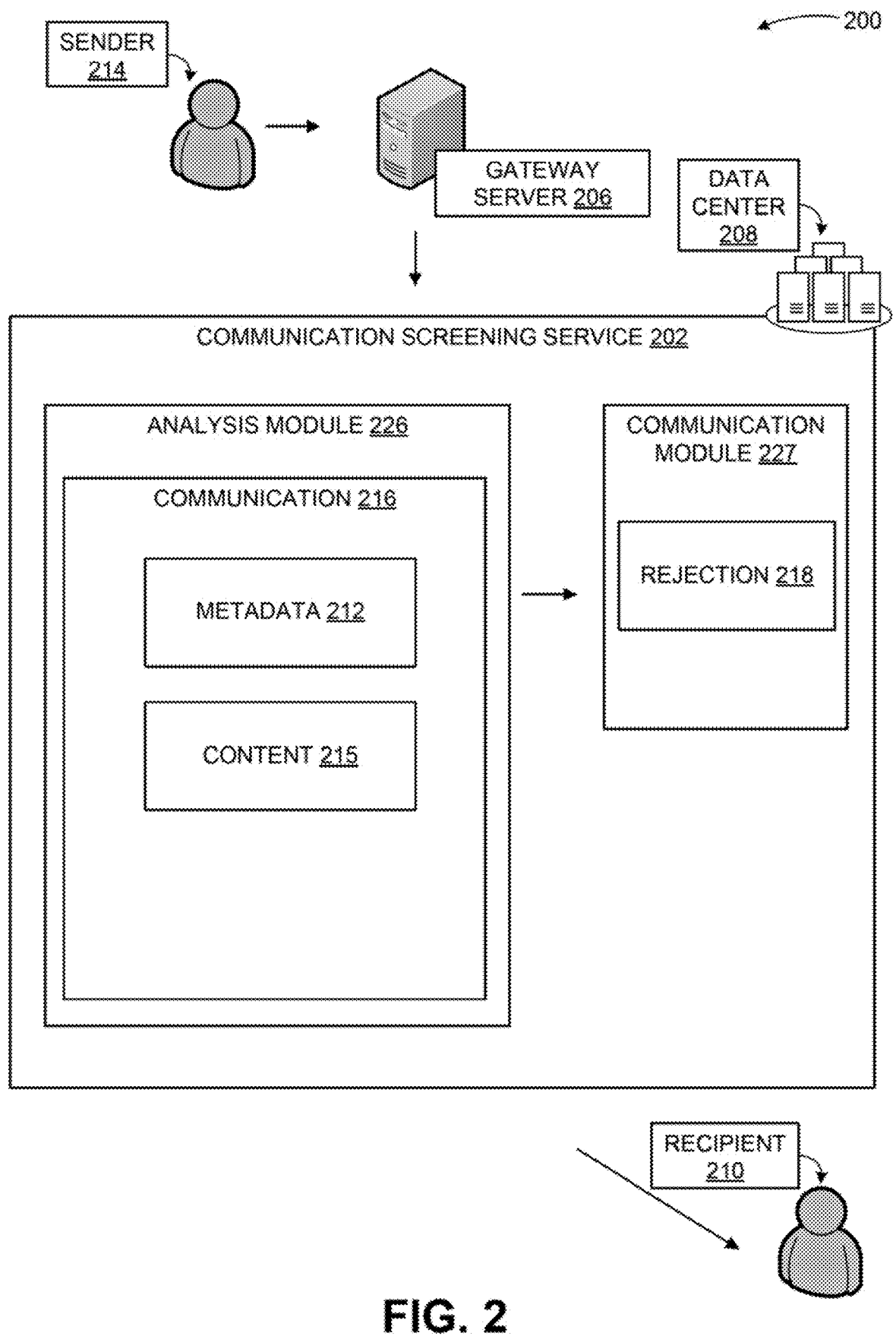
FIG. 2 is a display diagram illustrating example components of a service to block undesirable communications in a VOIP system, according to embodiments.

FIG. 2 is a display diagram illustrating example components of a service to block undesirable communications in a VOIP system, according to embodiments.

In a diagram 200, a communication screening service 202 may initiate operations to block undesirable communications in a VOIP system by processing and rejecting incoming communication(s) that are deemed to be undesirable, for example, pose a threat to a recipient 210. In an example scenario, a sender 214 may attempt to initiate a communication 216 with a recipient 210. The gateway server 206 may route the communication 216 through a datacenter 208, which may analyze the communication 216 using a communication screening service 202 to block the attempted undesirable communication from the sender 214. Alternatively, the communication screening service 202 may intercept the communication 216 during a communication session between the sender 214 and the recipient 210. The datacenter 208 may analyze and process the communication 216 in real-time.

An analysis module 226 of the communication screening service may analyze a metadata 212 and a content 215 of the communication 216. The metadata 212 may be parsed to detect the nature of the communication 216. In an example scenario, a spoofed origin internet protocol (IP) address of the communication 216 may be identified in the metadata 212. Spoofing entails changing an origin address of the communication 216 to another address. The spoofed origin IP address may be used by the sender 214 to make the communication 216 seem to be transmitted from a legitimate source. A detected spoofed origin IP address of the communication may be used to classify the communication 216 as being undesirable because of unreliable origin.

Next, a rejection 218 may be generated. The rejection may include instruction(s) to disrupt the communication 216 by terminating the communication 216, notifying the recipient 210 of the blocking, notifying law enforcement of the communication 216 and the sender 214, and/or notifying the sender 214 of a detection of the undesirable communication and the notification to the law enforcement, among others. A communication module 227 of the communication screening service 202 may transmit the rejection to the gateway server 206 to prompt the gateway server 206 to disrupt the communication. The rejection may also trigger a capture of the threat signature and save the signature to a data store. The data store may then be queried close to the edge of the datacenter for fast detection later.

Alternatively, the metadata may be processed to identify an origin location of the communication 216. The origin location may be matched to a geographical region that is identified with an increased risk of receiving undesirable communications such as scam calls. Threat assessment and tracking may be done by the datacenter 208 or retrieved from a threat assessment source to identify attributes of the message that match the increased risk of threat.

Next, a communication history of the recipient 210 may be processed to identify previous communication(s) with previous sender(s) from the geographical region. The previous communication(s) may be assessed based on a frequency and/or a recentness of the previous communication(s). A low frequency and/or a remote previous communication may be deemed to have a low value to legitimize the communication 216. Alternatively, a frequent and/or a near previous communication may be deemed to have a high value to legitimize the communication 216. Upon detecting the communication history to have frequent and/or near previous communication(s), the communication 216 may be classified as legitimate because the recipient 210 is identified as in communication with other(s) in the geographical region matching the communication 216.

Alternatively, the communication 216 may be classified as undesirable if the communication history shows a lack of previous communication(s) with previous senders from the geographical region. In such a scenario, the rejection 218 may be generated and transmitted to the gateway server 206 to disrupt the communication 216.

The analysis module 226 of the communication screening service 202 may also process the content 215 of the communication 216 to identify a dialect or an accent associated with the sender 214. The content may include audio data. The dialect or the accent may be matched to localization attribute(s) identified with an increased risk of receiving an undesirable communication. The localization attribute(s) associated with risk assessment may be maintained and/or managed locally by the datacenter 208 or retrieved from a risk assessment source. The communication 216 may be classified as legitimate upon identifying previous communication(s) to previous sender(s) with the dialect or the accent from a communication history of the recipient 210. Alternatively, the communication 216 may be classified as undesirable upon detecting a lack of a previous conversation with a previous sender with the dialect or the accent within the communication history of the recipient 210.

Furthermore, the content may be processed by the analysis module 226 to identify a gesture, a mannerism, or a behavior, among others of the sender 214. The content may include audio data or video date. Next, the gesture, the mannerism, and/or the behavior, among others of the sender 214 may be matched with an increased risk of receiving the undesirable communication. An example may include the sender 214 exhibiting dubious body language or assertive language to force the recipient 210 to act under pressure without full consideration of consequences of the action. Next, the communication history of the recipient 210 may be processed to detect existence of or a lack of previous communication(s) with previous sender(s) with the gesture, the mannerism, and/or the behavior, among others. The communication 216 may be classified as legitimate upon detecting the existence of previous communication(s) with similar gesture, mannerism, and/or behavior. The communication 216 may be classified as undesirable in response to detecting a lack of previous communication(s) with similar gesture, mannerism, and/or behavior in the communication history.

Figure 3:
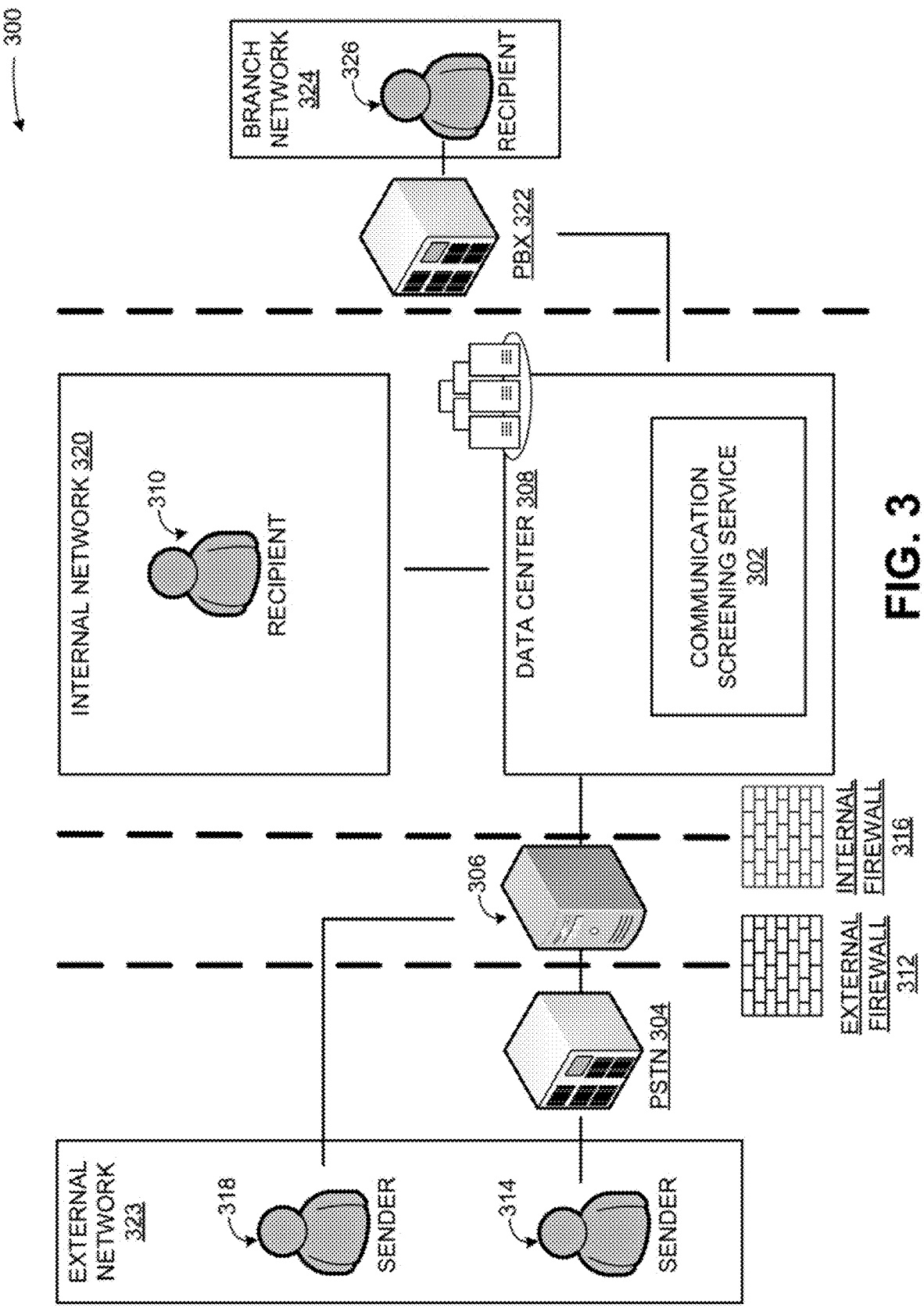
FIG. 3 is a display diagram illustrating components of a scheme to block undesirable communications in a VOIP system, according to embodiments.

FIG. 3 is a display diagram illustrating components of a scheme to block undesirable communications in a VOIP system, according to embodiments.

In a diagram 300, a communication screening service 302 may analyze a communication from a sender 318 or a sender 314. The sender 318 or the sender 314 may attempt to initiate a communication with the recipient 326 from an external network 323 with computing devices outside an external firewall 312. The external firewall may monitor and filter communications with external computing device(s). In multi-modal calls, a conversation may include exchanged data files, screen sharing, and similar data exchanges. These components of the communication may also be analyzed. A gateway server 306 may reside between the external firewall and internal firewall 316 and intercept incoming and outgoing communications. The gateway server 306 may provide initial management and routing of the communications with external device(s).

The sender 318 may initiate a communication that is not a VOIP communication, such as a phone call through a public switch telephone network (PSTN) with a recipient 326 or a recipient 310. The gateway server 306 may intercept the communication that is not a VOIP communication and convert it to a VOIP communication for transmission through the datacenter 308. The communication screening service 302 may analyze the communication at the datacenter 308 to detect whether the communication is undesirable. In an example scenario, the communication screening service 302 may process the metadata and the content of the communication to identify a pattern associated with the undesirable communication. The pattern may include keyword(s), a progress, a flow, and/or a timing, among other patterns of the communication. Upon detecting the pattern, the communication may be classified as undesirable. Pattern(s) may be managed by the datacenter 308 locally or retrieved from a pattern source associated with threat analysis.

In an example scenario, a notification may be transmitted to the recipient 310 of the communication. The notification may describe, for example, a threat associated with the communication and request a validation of the threat. Upon receiving the validation of the threat from the recipient 310, the communication screening service 302 may classify the communication as undesirable for including a threat. Next, attribute(s) of the communication may be recorded as associated with an undesirable communication. The attribute(s) may include an identification of the sender such as the sender (318 or 314), an origin location of the communication, and a pattern of the communication.

A destination of the communication may also include a recipient 326 located in a branch network 324. The communication screening service 302 may transmit a communication that is legitimate to the recipient 326 through a public branch exchange (PBX) 322. The PBX may convert the communication to a standard (such as a phone call) available as a communication modality within the branch network 324 to the recipient 326. The PBX 322 may also provide interaction capabilities to the communication screening service 302 to allow the communication screening service 322 to interact with the recipient 326 for feedback or notification(s) in relation to an identified threat associated with a communication.

Figure 4:
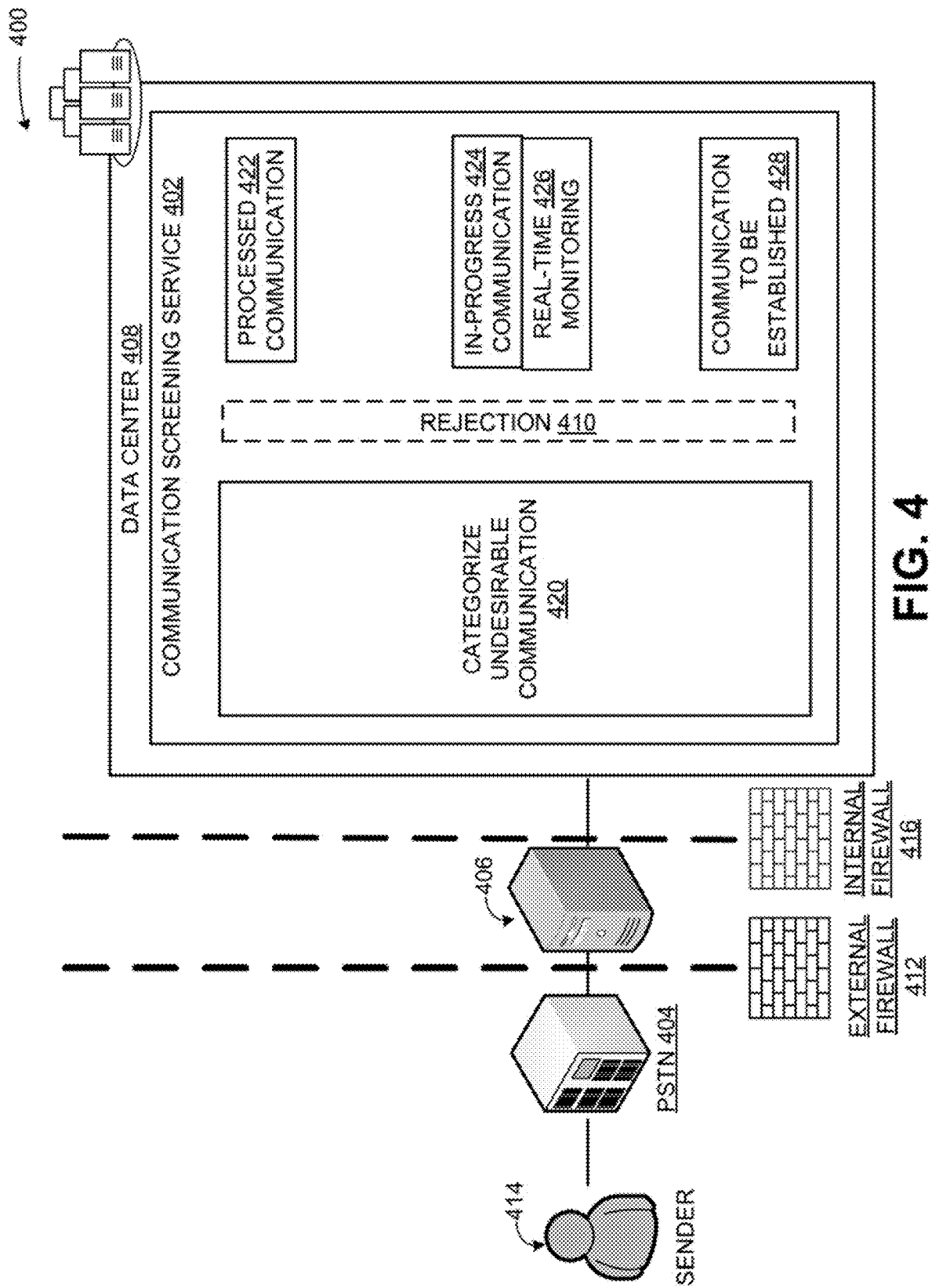
FIG. 4 is a display diagram illustrating an example of a scheme to block undesirable communications in a VOIP system, according to embodiments.

FIG. 4 is a display diagram illustrating an example interface a scheme to block undesirable communications in a VOIP system, according to embodiments.

In a diagram 400, a communication intercepted from a sender 414 may initiate operations to analyze the communication by a communication screening service 402 executed by a datacenter 408. The communication from the sender 414 may be transmitted through a PSTN 404, which may route the message to the gateway server 406. The message may be transmitted through an external firewall 412 with rules to filter messages based on organizational or individual settings. The gateway server 406 may transmit the message through an internal firewall 416 to the communication screening service 402 to prompt the communication screening service 402 to analyze the message for a threat.

The communication screening service 402 may process the communication with the categorization module 420 by analyzing the metadata and/or the content of the communication. Levels of categorization may change based on number of undesirability (or threat) indicators found in the metadata and/or content of the communication. The communication screening service may situate the communication at a higher undesirability level when detecting a high number of indicators. Similarly, the communication screening service 402 may situate the communication at a lower undesirability level when detecting a low number of indicators.

The communication screening service 402 may initiate operations to analyze the communication at a communication to be established stage 428. During the initial stage, a request to establish the communication may be received and analyzed by the communication screening service 402 to identify the undesirable communication. Next, the communication may be monitored in real-time 426 during the in-progress communication 424 stage. The content and metadata of the in-progress communication 424 may be processed to detect the undesirability indicators. Furthermore, the processed communication 422 may be provided to the categorization module 420 to record a reason for undesirability (e.g., threat) and attributes of the communication to be used in analysis of new communication(s) to identify new undesirable communication(s). The rejection 410 may also be generated at any stage during analysis of the communication to be established 428, the in-progress communication 424, and/or the processed communication 422 stage(s). The rejection 410 may be transmitted to the gateway server 406 to disrupt the communication.

The communication screening service 402 may store attributes of the communication as associated with an undesirable communication using a learning scheme. New communication(s) may be processed with the learning scheme to evaluate matches to the attribute(s) to identify them as undesirable communication(s). The learning scheme may include one or more of a boosted decision tree scheme, a linear scheme, a Bayesian linear scheme, a decision forest scheme, a fast forest quantile scheme, a neural network scheme, a Poisson scheme, and/or an ordinal scheme, among others.

As discussed above, the communication screening service 402 may be employed to perform operations to automate blocking of undesirable communications in a VOIP system. An increased user efficiency with the datacenter may occur as a result of analyzing metadata and content of a communication through the communication screening service 102, for example, by determination of threat signatures and propagation to edge servers of the datacenter for progressively earlier detection. Additionally, processing the metadata and the content of the communication to detect a threat from a sender, by the communication screening service 102, may reduce processor load, increase processing speed, conserve memory, and reduce network bandwidth usage.

Embodiments, as described herein, address a need that arises from a lack of efficiency to block a communication established to execute a scamming or a phishing scheme. The actions/operations described herein are not a mere use of a computer, but address results that are a direct consequence of software used as a service offered to large numbers of users and applications.

The example scenarios and schemas in FIGS. 1 through 4 are shown with specific components, data types, and configurations. Embodiments are not limited to systems according to these example configurations. Blocking undesirable communications in a VOIP system may be implemented in configurations employing fewer or additional components in applications and user interfaces. Furthermore, the example schema and components shown in FIGS. 1 through 4 and their subcomponents may be implemented in a similar manner with other values using the principles described herein.

Figure 5:
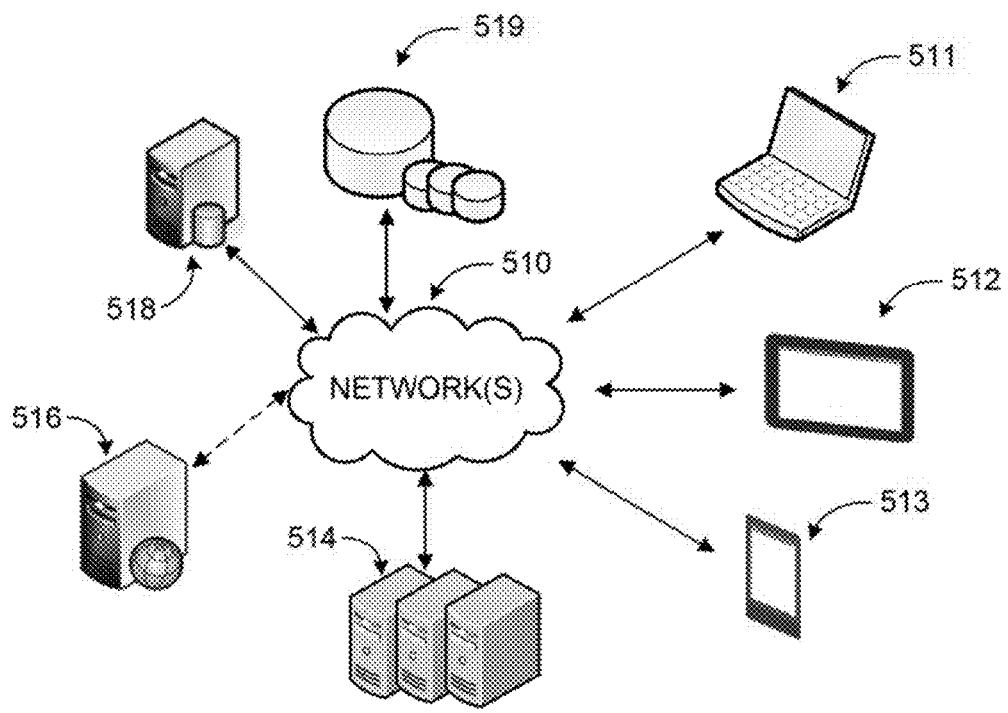
FIG. 5 is a simplified networked environment, where a system according to embodiments may be implemented.

FIG. 5 is an example networked environment, where embodiments may be implemented. A communication screening service 402 to block undesirable communications in a VOIP system may be implemented via software executed over one or more servers 514 such as a hosted service. The platform (or a custom device to execute the operations to block undesirable communications in a VOIP system) may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A communication screening service may receive a communication from a gateway server, which may include the VOIP communication. A metadata and/or a content of the communication may be analyzed to detect undesirable communications from a sender. A rejection of the communication may be generated to disrupt the undesirable communication. The rejection may be transmitted to a gateway server to prompt the gateway server to block the communication. The communication screening service may store data associated with the product or service in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to block undesirable communications in a VOIP system. Furthermore, the networked environments discussed in FIG. 5 are for illustration purposes only. Embodiments are not limited to the example applications, modules, or processes.

Figure 6:
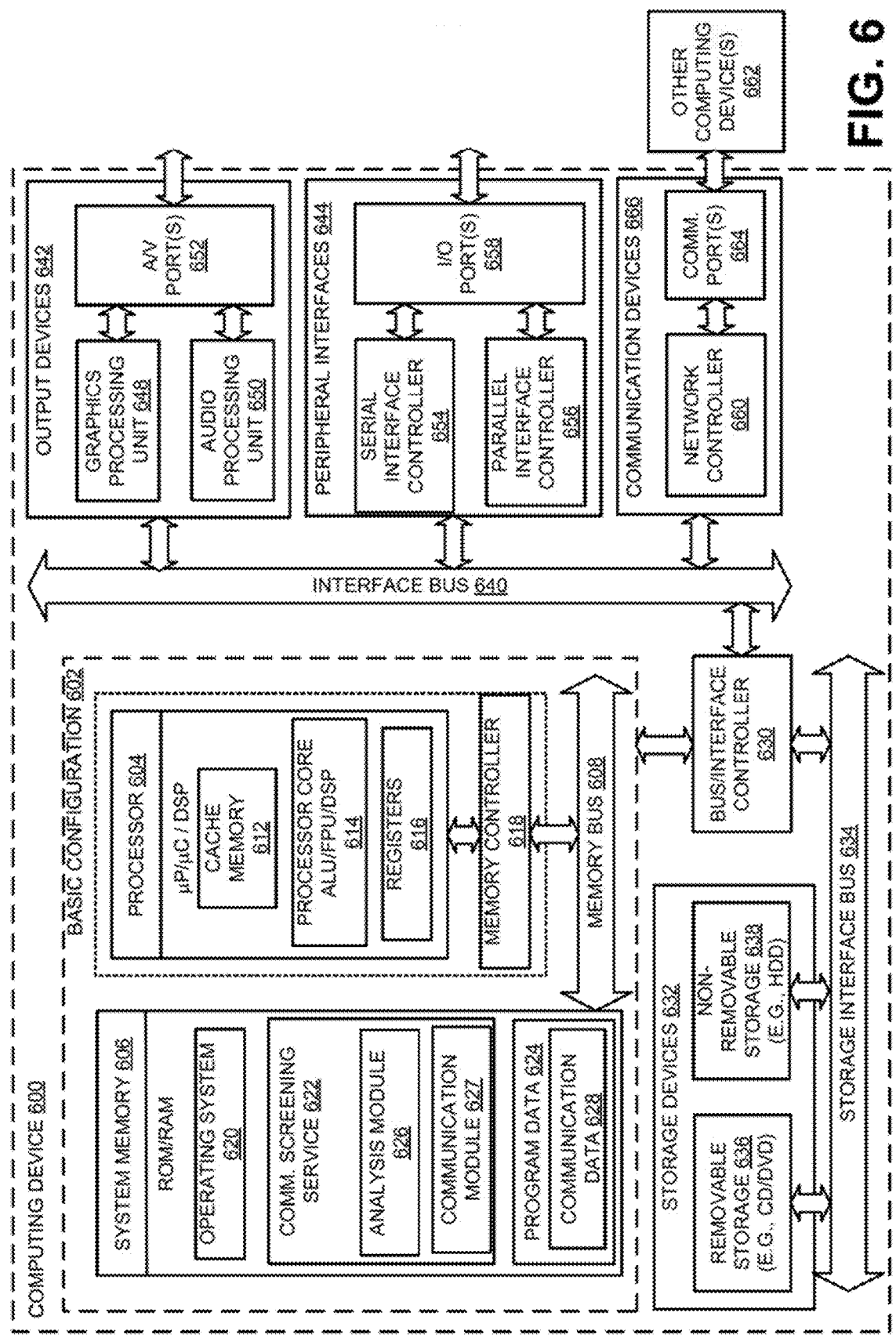
FIG. 6 is a block diagram of an example computing device, which may be used to block undesirable communications in a VOIP system, according to embodiments.

FIG. 6 is a block diagram of an example computing device, which may be used to block undesirable communications in a VOIP system, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), an application-specific integrated circuit (ASIC), a field-programmable gate array (FPGA), programmable logic device (PLD), a free form logic on an integrated circuit (IC) or other or any combination thereof. The processor 604 may include one or more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a communication screening service 622, and a program data 624. The communication screening service 622 may include components such as an analysis module 626 and a communication module 627. The analysis module 626 and the communication module 627 may execute the processes associated with the communication screening service 622. The analysis module 626 may receive a communication from a gateway server, which may include the VOIP communication. A metadata and/or a content of the communication may be analyzed to detect the undesirable communication. A rejection of the communication may be generated to block the communication. The communication module 627 may transmit the rejection to a gateway server to prompt the gateway server to disrupt the communication.

Input to and output out of the communication screening service 622 may be transmitted through a communication device associated with the computing device 600. An example of the communication device may include a networking device that may be communicatively coupled to the computing device 600. The networking device may provide wired and/or wireless communication. The program data 624 may also include, among other data, communication data 628, or the like, as described herein. The communication data 628 may include metadata and/or content, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication device(s) 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to block undesirable communications in a VOIP system. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
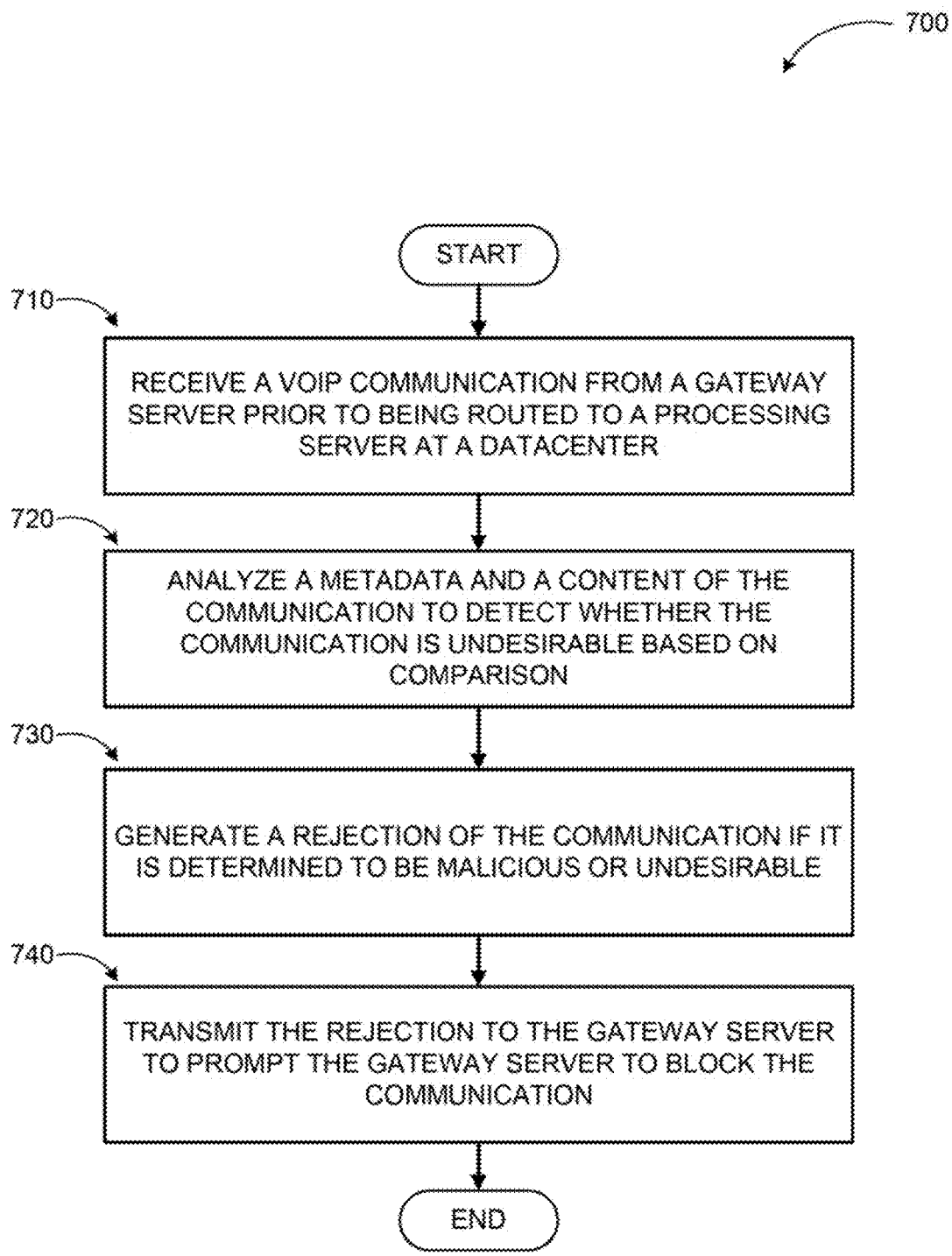
FIG. 7 is a logic flow diagram illustrating a process for blocking undesirable communications in a VOIP system, according to embodiments.

FIG. 7 is a logic flow diagram illustrating a process for blocking undesirable communications in a VOIP system, according to embodiments. Process 700 may be implemented on a computing device, such as the computing device 600 or another system.

Process 700 begins with operation 710, where the communication screening service may receive a communication from a gateway server. The communication may include a VOIP communication. The VOIP communication may include any kind of digital communication, such as an audio and/or a video conversation, and/or an audio and/or a video conference, among others. At operation 720, a metadata and a content of the communication may be analyzed to detect a nature of the communication as an undesirable or malicious communication. For example, the communication may include a scamming scheme, and/or a phishing scheme, among others. The analysis may include a comparison of the metadata and/or the content to a set of known threat or undesirability patterns. For example, previously detected and recorded malicious communication signatures may be used as patterns for communication. Other patterns may include, but are not limited to, an original of the call, an accent of the caller, an origination IP address not matching true records, and similar ones. The analysis may also include speech-to-text conversion and analysis of the textual data as well as analysis of audio or video data.

At operation 730, a rejection of the communication may be generated to block the communication. The rejection may include a number of instructions to stop the communication at the gateway server, among other instructions. At operation 740, the rejection may be transmitted to the gateway server to prompt the gateway server to block the communication.

The operations included in process 700 are for illustration purposes. Blocking undesirable communications in a VOIP system may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some examples, a datacenter to mitigate undesirable or malicious communications in a voice over internet protocol (VOIP) system is described. The datacenter may include at least one physical server that includes a communication device; a memory configured to store instructions associated with a communication screening service; and one or more processors coupled to the memory and the communication device, the one or more processors executing the communication screening service in conjunction with the instructions stored in the memory. The communication screening service may include an analysis module configured to receive, through the communication device, a VOIP communication from a gateway server prior to the VOIP communication being routed to a communication processing server in the datacenter; analyze metadata and content of the VOIP communication to determine whether the VOIP communication is malicious by comparing the metadata and content of the VOIP communication to a set of known threat patterns or undesirability patterns; if the VOIP communication is and determined to be malicious or undesirable, generate a rejection of the VOIP communication. The communication screening service may further include a communication module configured to transmit, through the communication device, the rejection to the gateway server to prompt the gateway server to block the VOIP communication.

According to other examples, the VOIP communication may include one or more of an audio conversation, a video conversation, an audio conference, and a video conference. The analysis module may be further configured to process the metadata to identify a spoofed origin internet protocol (IP) address of the VOIP communication and classify the VOIP communication as undesirable based on the identified spoofed origin IP address. The analysis module may be further configured to process the metadata to identify an origin location of the VOIP communication and match the origin location to a geographical region that is identified with an increased risk of originating undesirable or malicious communications.

According to further examples, the analysis module may be further configured to process a communication history of a recipient to identify one or more previous communications with one or more previous senders from the geographical region based on one or more of a frequency and a recentness of the one or more previous communications to the geographical region; and classify the VOIP communication as legitimate based on the identified one or more previous communications. The analysis module may also be configured to process a communication history of a recipient to identify a lack of one or more previous communications with one or more previous senders from the geographical region; and classify the VOIP communication as undesirable or malicious based on the identified lack of one or more previous communications.

According to yet other examples, the analysis module may be further configured to process the content to identify one or more of a dialect and an accent associated with a sender, where the content includes audio data; and match one or more of the dialect and the accent to one or more localization attributes identified with an increased risk of receiving an undesirable or malicious communication. The analysis module may be further configured to process a communication history of a recipient to identify one or more previous communications with one or more previous senders with one or more of the dialect and the accent; and classify the VOIP communication as legitimate based on the identified previous communications. The analysis module may be further configured to process a communication history of a recipient to detect a lack of one or more previous conversations with one or more previous senders with one or more of the dialect and the accent; and classify the VOIP communication as undesirable or malicious based on the detected lack of previous conversations.

According to some examples, the analysis module may be further configured to process the content to identify one or more of a gesture, a mannerism, and a behavior of a sender, where the content includes audio data and video data; and match one or more of the gesture, the mannerism, and the behavior of the sender with an increased risk of originating undesirable or malicious communications. The analysis module may be further configured to process a communication history of a recipient to detect a lack of one or more previous conversations with one or more previous senders with one or more of the gesture, the mannerism, and the behavior; and classify the VOIP communication as undesirable or malicious based on the detected lack of previous conversations.

According to other examples, a method executed on a computing device to mitigate undesirable or malicious communications in a voice over internet protocol (VOIP) system is described. The method may include receiving a VOIP communication from a gateway server prior to routing the VOIP communication to a communication processing server in a datacenter; analyzing metadata and content of the VOIP communication to determine whether the VOIP communication is malicious by comparing the metadata and content of the VOIP communication to a set of known threat patterns or undesirability patterns; if the VOIP communication is determined to be malicious or undesirable, generating a rejection of the VOIP communication; and transmitting the rejection to the gateway server to prompt the gateway server to block the VOIP communication.

According to further examples, the method may also include processing the metadata and the content of the VOIP communication to identify a pattern associated with a threat posed by the VOIP communication, where the pattern includes one or more of one or more keywords, a progress, a flow, and a timing of the VOIP communication; and classifying the VOIP communication based on the pattern. The method may further include transmitting a notification to a recipient of the VOIP communication, where the notification describes a threat posed by the VOIP communication and requests a validation of the threat.

According to some examples, the method may also include receiving the validation of the threat from the recipient; classifying the VOIP communication as including the threat, where the threat includes one of a scam and a phishing scheme; and recording one or more attributes of the VOIP communication as associated with the threat, where the one or more attributes include one or more of a sender, an origin location of the VOIP communication, and a pattern of the VOIP communication. Method may further include receiving a new VOIP communication with one or more attributes that match a previous VOIP communication classified as undesirable; generating a new rejection to block the new VOIP communication; and transmitting the new rejection to the gateway server to prompt the gateway server to block the new VOIP communication. The method may also include storing one or more attributes of the VOIP communication by using a learning scheme; and processing one or more new VOIP communications based on the learning scheme.

According to further examples, a computer-readable memory device with instructions stored thereon to block undesirable or malicious communications in a voice over internet protocol (VOIP) system is described. The instructions may include receiving a VOIP communication from a gateway server, where the VOIP communication includes one or more of an audio conversation, a video conversation, an audio conference, and a video conference; analyzing metadata and content of the VOIP communication to determine whether the VOIP communication is malicious by comparing the metadata and content of the VOIP communication to a set of known threat patterns or undesirability patterns, where the threat includes one or more of a scamming scheme and a phishing scheme; if the VOIP communication is determined to be malicious or undesirable, generating a rejection of the VOIP communication to disrupt the threat associated with the VOIP communication; and transmitting the rejection to the gateway server to prompt the gateway server to block the VOIP communication.

According to other examples, the instructions may also include processing the metadata to identify an origin location of the VOIP communication; and matching the origin location to a geographical region that is identified with an increased risk of originating undesirable or malicious communications; processing a communication history of a recipient to identify a lack of one or more previous communications to one or more previous senders from the geographical region; and classifying the VOIP communication as undesirable or malicious. The instructions may further include transmitting a notification to a recipient of the VOIP communication, where the notification describes the posed threat and requests a validation of the threat; receiving the validation of the threat from the recipient; classifying the VOIP communication as including the threat; and recording one or more attributes of the VOIP communication as associated with the threat, where the one or more attributes include one or more of a sender, an origin location of the VOIP communication, and a pattern of the VOIP communication.

According to some examples, a means for mitigating undesirable or malicious communications in a voice over internet protocol (VOIP) system is described. The means may include a means for receiving a VOIP communication from a gateway server prior to routing the VOIP communication to a communication processing server in a datacenter; a means for analyzing metadata and content of the VOIP communication to determine whether the VOIP communication is malicious by comparing the metadata and content of the VOIP communication to a set of known threat patterns or undesirability patterns; if the VOIP communication is determined to be malicious or undesirable, a means for generating a rejection of the VOIP communication; and a means for transmitting the rejection to the gateway server to prompt the gateway server to block the VOIP communication.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A server to mitigate undesirable or malicious communications in a voice over internet protocol (VOIP) system, the server comprising:
   a memory configured to store instructions;
   a processor coupled to the memory and a communication device configured to send and receive a VOIP communication from a gateway server, wherein the processor, in conjunction with the instructions stored in the memory, is configured to:
      receive the VOIP communication from the gateway server prior to the VOIP communication being routed to a recipient's device;
      analyze the VOIP communication;
      detect one or more undesirability indicators of the VOIP communication based on the analysis;
      categorize the VOIP communication to an undesirability level among a plurality of undesirability levels based on the one or more undesirability indicators;
      determine whether to reject or allow the VOIP communication to be routed to the recipient's device based on the undesirability level; and
      transmit, to the gateway server, a rejection to prompt the gateway server to block the VOIP communication or an instruction to allow the VOIP communication to be routed to the recipient's device based on the determination,
   wherein the undesirability indicator includes at least one selected from a group consisting of whether an origin internet protocol (IP) address of the VOIP communication is spoofed, whether one or more previous communications from one or more previous senders of the geographical region have been received, a frequency of the one or more previous communications to or from the geographical region, and a recentness of the one or more previous communications to or from the geographical region.

2. The server of claim 1, wherein the processor is configured to categorize the VOIP communication by:
categorizing the VOIP communication to the undesirability level among the plurality of undesirability levels based on a number of one or more detected undesirability indicators.

3. The server of claim 2, wherein the processor is further configured to:
store one or more attributes and the one or more undesirability indicators associated with the VOIP communication.

4. The server of claim 3, wherein the processor is further configured to:
train a machine learning model based on the stored one or more attributes and the one or more undesirability indicators to analyze a new VOIP communication.

5. The server of claim 4, wherein the machine learning model includes one or more of a boosted decision tree scheme, a linear scheme, a Bayesian linear scheme, a decision forest scheme, a fast forest quantile scheme, a neural network scheme, a Poisson scheme, or an ordinal scheme.

6. The server of claim 1, wherein the processor is further configured to:
receive a second VOIP communication from the gateway server while the VOIP communication is in progress;
analyze metadata of the second VOIP communication;
if the second VOIP communication is determined to be malicious or undesirable, transmit an instruction to the gateway server to prompt the gateway server to disrupt the in-progress VOIP communication; and
if the second VOIP communication is not determined to be malicious or undesirable, allow the in-progress VOIP communication to continue.

7. A method executed on a computing device to mitigate undesirable or malicious communications in a voice over internet protocol (VOIP) system, the method comprising:
receiving a first VOIP communication from a gateway server prior to the VOIP communication being routed to a recipient's device;
analyzing the first VOIP communication;
determining whether to reject or allow the first VOIP communication to be routed to the recipient's device based on the analysis of the first VOIP communication; and
transmitting, to the gateway server, a rejection to prompt the gateway server to block the first VOIP communication or an instruction to allow the first VOIP communication to be routed to the recipient's device based on the determination,
receive a second VOIP communication from the gateway server while the first VOIP communication is in progress;
analyze the second VOIP communication; and
if the second VOIP communication is determined to be malicious or undesirable based on the analysis of the second VOIP communication, transmit an instruction to the gateway server to prompt the gateway server to disrupt the in-progress first VOIP communication.

8. The method of claim 7, further comprising:
detecting one or more undesirability indicators based on the analysis of the first VOIP communication;
categorizing the first VOIP communication to an undesirability level among a plurality of undesirability levels based on the detected one or more undesirability indicators; and
determining whether to reject or allow the first VOIP communication to be routed to the recipient's device based on the undesirability level.

9. The method of claim 8, wherein detecting the one or more undesirability indicators based on the analysis of the first VOIP communication comprises:
processing content of the first VOIP communication to identify one or more of a dialect and an accent associated with a sender, wherein the content includes audio data; and
matching one or more of the dialect and the accent to one or more localization attributes identified with an increased risk of receiving an undesirable or malicious communication.

10. The method of claim 9, wherein detecting the one or more undesirability indicators based on the analysis of the first VOIP communication comprises:
processing a communication history of the recipient to identify one or more previous VOIP communications with one or more previous senders that include or lack one or more of the dialect and the accent; and
classifying the first VOIP communication as legitimate or undesirable based on a presence or lack of the identified previous communications.

11. The method of claim 8, wherein detecting the one or more undesirability indicators based on the analysis of the first VOIP communication comprises:
processing content of the first VOIP communication to identify one or more of a gesture, a mannerism, and a behavior of a sender, wherein the content includes audio data and video data; and
matching one or more of the gesture, the mannerism, and the behavior of the sender with an increased risk of originating undesirable or malicious communications.

12. The method of claim 11, wherein detecting the one or more undesirability indicators based on the analysis of the first VOIP communication comprises:
processing a communication history of the recipient to identify one or more previous VOIP communications with one or more previous senders that include or lack one or more of the gesture, the mannerism, and the behavior of the sender; and
classifying the first VOIP communication as legitimate or undesirable based on a presence or lack of the identified previous communications.

13. The method of claim 8, further comprising: storing one or more attributes and the one or more undesirability indicators associated with the first VOIP communication.

14. The method of claim 13, further comprising:
training a machine learning model based on the stored one or more attributes and the one or more undesirability indicators to analyze a new VOIP communication.

15. A voice over internet protocol (VOIP) communication system, comprising:
a communication screening server configured to execute a communication screening service for mitigation of undesirable or malicious communications, the communication screening server comprising:
a memory configured to store instructions;
a processor coupled to the memory and a communication device configured to send and receive a VOIP communication from a gateway server configured to manage receipt and routing of VOIP communications among users of the VOIP system and external users, wherein the processor, in conjunction with the instructions stored in the memory, is configured to:
receive VOIP packets associated with the VOIP communication from the gateway server, wherein the VOIP communication is in-progress or awaiting routing to a recipient's device;
analyze the VOIP communication
detect one or more undesirability indicators based on the analysis of the VOIP communication;
categorize the VOIP communication to an undesirability level among a plurality of undesirability levels based on the one or more detected undesirability indicators;
determine whether to reject or allow the VOIP communication to be routed to a recipient's device based on the undesirability level; and
transmit, to the gateway server, a rejection to prompt the gateway server to block the VOIP communication or an instruction to allow the VOIP communication to be routed to the recipient's device based on the determination,
wherein the processor is configured to detect the one or more undesirability indicators from content of the VOIP communication and wherein the one or more undesirability indicators include identification of one or more of a dialect, an accent, a gesture, a mannerism, and a behavior associated with a sender.

16. The VOIP communication system of claim 15, wherein the processor is configured to detect the one or more undesirability indicators from metadata of the VOIP communication and wherein the one or more undesirability indicators include whether an origin internet protocol (IP) address of the VOIP communication is spoofed, whether one or more previous communications from one or more previous senders of the geographical region have been received, a frequency of the one or more previous communications to or from the geographical region, and a recentness of the one or more previous communications to or from the geographical region.

17. The VOIP communication system of claim 15, wherein the processor is further configured to:
train a machine learning model based on one or more attributes and the one or more undesirability indicators to analyze a new VOIP communication, wherein the machine learning model includes one or more of a boosted decision tree scheme, a linear scheme, a Bayesian linear scheme, a decision forest scheme, a fast forest quantile scheme, a neural network scheme, a Poisson scheme, or an ordinal scheme.

18. The VOIP communication system of claim 15, wherein the VOIP communication includes one or more of an audio conversation, a video conversation, an audio conference, and a video conference.

* * * * *